April 22, 1969 R. L. DUDLEY 3,440,448
GENERATOR FOR PRODUCING SYMMETRICAL TRIANGULAR WAVES OF VARIABLE REPETITION RATE
Filed Nov. 1, 1965
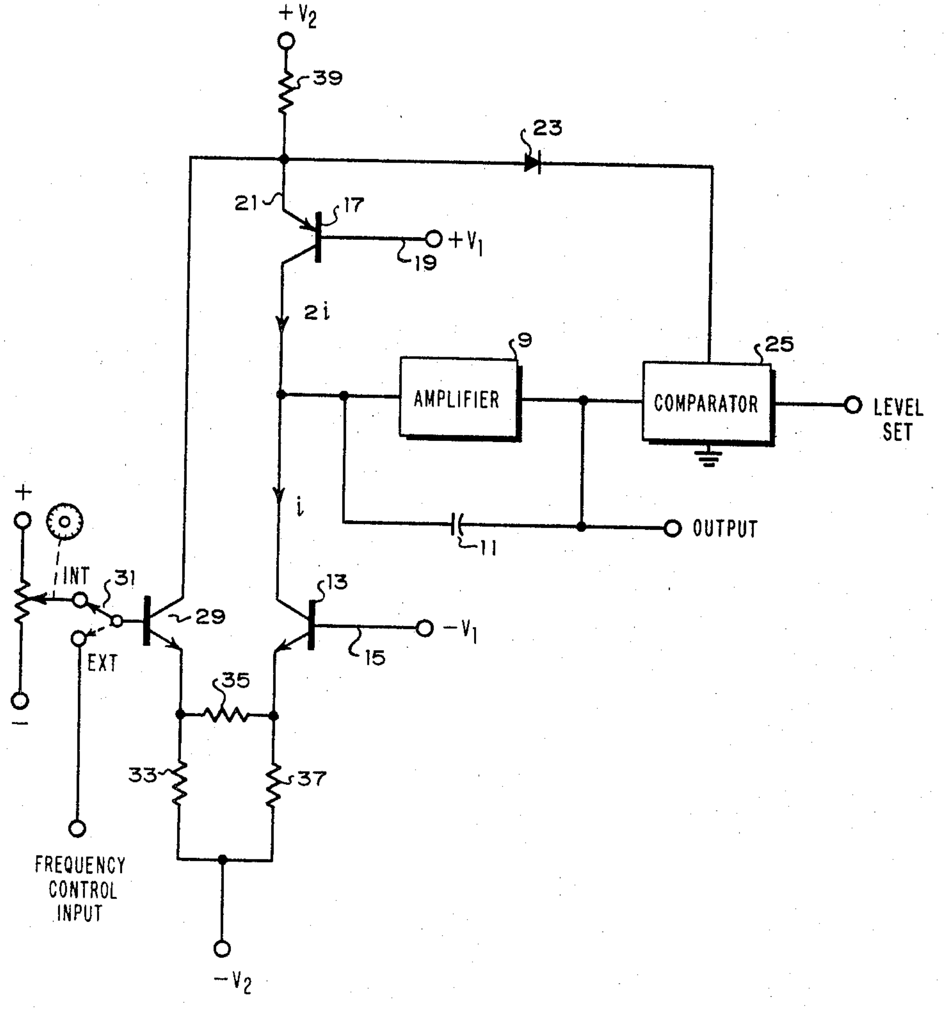
INVENTOR
ROBERT L. DUDLEY
BY R. C. Smith
ATTORNEY 3,440,448

GENERATOR FOR PRODUCING SYMMETRICAL TRIANGULAR WAVES OF VARIABLE REPETITION RATE

Robert L. Dudley, Loveland, Colo., assignor to Hewlett-Packard Company, Palo Alto, Calif., a corporation of California Filed Nov. 1, 1965, Ser. No. 505,796
Int. Cl. H03k *1/10*
U.S. Cl. 307—271 5 Claims

ABSTRACT OF THE DISCLOSURE

A waveform generator for producing symmetrical triangular waves of variable repetition rate includes an integrator circuit connected to receive the currents from a pair of current sources which are switched at set levels of amplitude of the generated triangular wave. The repetition rate of the triangular waveform is varied by altering the amplitude of both current sources in a fixed ratio.

Referring to the drawing which shows a schematic diagram of the circuit of the present invention, there is shown a phase inverting amplifier 9 shunted by an integrating capacitor 11. The output of amplifier 9 is connected to an input of the comparator 25 which has two stable operating states. The input of the integrator is connected to the lower current source including transistor 13 which has a base electrode 15 connected to a fixed voltage $-V_1$ and to the upper current source including transistor 17 which has a base electrode 19 connected to a fixed voltage $+V_1$. Initially, the upper current source is maintained non-operative by bias signal supplied to the emitter electrode 21 through diode 23 from the comparator 25 operating in one of its stable states. The current $i$ flowing in the integrator input to the lower current source causes the output of amplifier 9 connected to one input of comparator 25 to increase positively with time to the level of signal applied to another input of comparator 25. When these two signals are equal, comparator 25 switches to operation in the other stable state, thereby removing bias supplied to the upper current source through diode 23. This renders the upper current source operative to supply the current $2i$ which is exactly twice the value of current from the lower current source. The current which flows in the input of the integrator is thus equal and opposite to the current which previously flowed during the time the upper current source was nonoperative. This causes the output of the integrator to decrease with time toward its initial level, say ground. At the instant this output attains zero level, comparator 25 again switches to said one stable operating state, thereby reapplying bias through diode 23 to the upper current source to render it non-operative.

Operation of the circuit continues repetitively in this fashion at a frequency determined by the signal applied to the base of transistor 29. Switch 31 may be set for INTernal or EXTernal frequency control. Signal thus applied to the base of transistor 29 controls the current flowing in the emitter-collector circuit of transistor 29. Resistors 33, 35 are so chosen that the current flowing into the emitter of transistor 15 is exactly one-half the current flowing into the emitter 21 of transistor 17 as the current through transistor 29 varies in response to signal applied thereto through switch 31 from the selected frequency controlling signal source. The added currents applied to the emitters of transistors 15 and 17 from transistor 29 are thus related to the frequency-controlling signal applied to transistor 29. The currents flowing from the upper and lower current sources are thus varied in the fixed ratio of 2:1. Increase of these currents in response to signal applied to transistor 29 symmetrically controls the rise and fall rates of the output of amplifier between upper and lower set limits, thus resulting in control of the repetition rate of the triangular signal at the output of amplifier 9.

I claim:

1. Signal generating apparatus comprising:
an integrator having an input and an output;
a pair of current sources connected to the input of said integrator for supplying unequal currents thereto of opposite direction with amplitudes which are variable for varying the operating frequency and which remain in a selected ratio as the amplitudes vary; and
circuit means responsive to the amplitude of the output of said integrator for rendering the one of the pair of current sources supplying the larger current inoperative for outputs of the integrator between first and second levels and for rendering said one of the pair of current sources operative in response to said output attaining one of said first and second levels.

2. Apparatus as in claim 1 wherein:
said current sources have inputs for receiving control signals for supplying said unequal currents of opposite direction with amplitudes in a selected ratio related to control signals applied to said inputs; and
a signal-controlled element connected to the control-signal inputs of said current sources for supplying control signals thereto to alter the amplitudes of the currents therefrom in said selected ratio.

3. Apparatus as in claim 1 wherein:
each of said current sources includes a transistor having emitter, base and collector electrodes and having a resistor connected in the emitter circuit thereof;
a source of reference potential is connected to the base electrode of the transistor in each current source; and
a signal-controlled element is connected to a common terminal of the emitter electrode and resistor in each current source for controlling the voltage drop across said resistors in response to signals applied to said common terminals from said signal controlled element.

4. Apparatus as in claim 3 wherein:
said circuit means includes a comparator having first and second inputs connected to receive first and second reference voltages and having a third input connected to receive the output of said integrator, said comparator operating in one operating state for signals appearing at said first and third inputs attaining a predetermined relationship and operating in another operating state for signals appearing at said second and third inputs attaining a predetermined relationship; and
means including said comparator for applying bias to the one of said pair of current sources supplying the larger current for rendering it inoperative in response to operation of said comparator in one of its operating states.

5. Apparatus as in claim 3 wherein:

said signal-controlled element is a third transistor having a base electrode connected to receive frequency-controlling signal thereon and having emitter and collector electrodes connected to the common terminals of the emitter electrode and resistor in said current sources for altering the biases on the transistors of said current sources to vary the currents therefrom in said selected ratio.

References Cited

UNITED STATES PATENTS

| | | | |
|---|---|---|---|
| 3,138,767 | 6/1964 | Levin | 328—181 XR |
| 2,602,151 | 7/1952 | Carbrey | 328—182 XR |

ARTHUR GAUSS, *Primary Examiner.*

JOHN ZAZWORSKY, *Assistant Examiner.*

U.S. Cl. X.R.

307—228, 263; 328—127, 185